US007346892B2

(12) United States Patent
Shou et al.

(10) Patent No.: US 7,346,892 B2
(45) Date of Patent: Mar. 18, 2008

(54) PREDICTION AND PRE-SELECTION OF AN ELEMENT IN SYNTAX COMPLETION

(75) Inventors: Darren T. Shou, Los Angeles, CA (US); Randy S. Kimmerly, Woodinville, WA (US); Josefa Michael George Nalewabau, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 10/446,232

(22) Filed: May 27, 2003

(65) Prior Publication Data

US 2004/0243977 A1 Dec. 2, 2004

(51) Int. Cl.
*G06F 9/44* (2006.01)
(52) U.S. Cl. ...................... 717/112; 717/107
(58) Field of Classification Search ........ 717/110–117, 717/141–144
See application file for complete search history.

(56) References Cited

U.S. PATENT DOCUMENTS

| | | | |
|---|---|---|---|
| 4,674,065 A | 6/1987 | Lange et al. | |
| 5,267,155 A | 11/1993 | Buchanan et al. | |
| 5,392,386 A | 2/1995 | Chalas | |
| 5,815,830 A | 9/1998 | Anthony | |
| 5,859,636 A | 1/1999 | Pandit | |
| 5,946,647 A | 8/1999 | Miller et al. | 704/9 |
| 6,085,201 A | 7/2000 | Tso | 707/505 |
| 6,122,647 A | 9/2000 | Horowitz et al. | 707/513 |
| 6,305,008 B1 | 10/2001 | Vaidyanathan et al. | |
| 6,311,323 B1 | 10/2001 | Shulman et al. | |
| 6,367,068 B1 | 4/2002 | Vaidyanathan et al. | |
| 6,502,233 B1 | 12/2002 | Vaidyanathan et al. | 717/101 |

FOREIGN PATENT DOCUMENTS

EP 1320023 A2 * 6/2003

OTHER PUBLICATIONS

Sanders et al., "Word Prediction Strategies in Program Editing Environments", South African Computer Journal, No. 20, pp. 1-8, Dec. 1997.*
Lesher et al., "Effects of NGRAM Order and Training Text Size on Work Prediction", Proceedings of the RESNA '99 Annual Conference, Arlington VA, pp. 52-54, 1999.*
IBM Technical Disclosure Bulletin, "Dynamic Code Creation and Validation from Syntax Diagrams", vol. No. 40, Issue No. 11, pp. 63-66, Nov. 1997.*
Welsh et al. "A Design Rationale for a Language-based Editor", CiteSeer: Software-13 Practice and Experience, pp. 923-948, 1991.*
Willisson, Pace, et al., ISPELL: UNIX Man Pages, Aug. 23, 2003, 73 pages.
McMahon, L.E., "SED-A Non-Interactive Text Editor", *Bell Laboratories*, Aug. 15, 1978, 10 pages.
CoStar User's Manual, "For AddressMate and AddressMate Plus", CoStar Corp., 1994-1995, pp. 1-1 thru Index-210.

(Continued)

*Primary Examiner*—Ted T. Vo
(74) *Attorney, Agent, or Firm*—Woodcock Washburn LLP

(57) ABSTRACT

A system, method and computer-readable medium supports a feature that predicts a selection based on history of use and uses this information to pre-select an item in a list for syntax completion in a source program editor.

41 Claims, 6 Drawing Sheets

OTHER PUBLICATIONS

IBM Research Disclosure #368, "Multimedia Hyperlinks Automatically Created for Reference Documents", Jun. 1993, 5 pages.

Microsoft® Office 97 User's Manual, "Getting Results with Microsoft® Office 97—Real World Solutions for the Work You Do", 1997, 1-703.

Corel® Corporation Limited, Corel® InfoCentral User's Manual, 1996, vol. 1, Version 7.0, 1996, 1 thru 86.

Novell® GroupWise™ User's Guide for Windows 16-Bit, Version 5.2, 1993-1997, 1-231.

Novell® Group Wise™ User's Guide for Windows 32-Bit, 1998, Novell, Inc., 1-318.

Claris for Macintosh, Claris Emailer Getting Started, 1995-1997, Claris Corporation, 61 pages.

Developer's Guide to Apple Data Detectors-For Version 1.0.2, © Apple Computer, Inc., 1997, 1-34.

Apple Data Detectors User's Manual, © 1997 Apple Computer, Inc., 1-16.

Nardi, B.A. et al., "Collaborative, Programmable Intelligent Agents", Mar. 1998, Apple Computer advanced Technology Group, 1-11.

Anderson, K.M. et al., "Chimera: Hypertext fot Heterogeneous Software Environments", *Association for Computing Machinery*, 1994, *ECHT '94 Proceedings*, Department of Information and Computer Science, University of California, Irvine California, USA, 94-107.

Hughes, G. et al., "Microsoft Smart Tags: Support Ignore or Condemn Them?", *Association of Computing Machinery*, Jun. 11-15, 2002, 80-81.

Lewis, P.H. et al., "Media-based Navigation with Generic Links", *Association of Computing Machinery*, 1996, The Multimedia Research group, Department of Electronics and Computer Science, University of Southampton, England, 215-223.

Henninger, S. et al., "A Tool For Managing Software Development Knowledge", *PROFES*, 2001. LNCS 2188, 141-152.

Kucza, T. et al., "Improving Knowledge Management in Software Reuse Process", *PROFES*, 2001, LNCS 2188, 141-152.

Middel, C.D., "Software Configuration and Change Management", *Proceedings 5$^{th}$ Conference on Quality Engineering in Software Technology*, 2001, 239-245 (English Language Abstract).

Jewell, D. "Windows Shell Secrets", *EXE*, 1999, 13(9), 35-45.

Kramer, B. "3D LISP Tools", *Cadence*, 1989, 4(5), 130-134.

Lin, C.F. et al., "Chinese Text Distinction and Font Identification by Recognizing most Frequently Used Characters", *Image and Vision Computing*, 2001, 19, 329-338.

Willisson, Pace, et al., ISPELL: UNIX Man Pages, Aug. 23, 2003, 73 pages.

SED(1), BSD Reference Manual, Dec. 30, 1993 sedMan.txt, 6 pages.

McMahon, L.E., "SED-A Non-Interactive Text Editor", *Bell Laboratories*, Aug. 15, 1978, 10 pages.

The Complete Red Hat® Linux™ Operating System 5.2 Deluxe, Macmillan Digital Publishing, U.S.A., © 1995, 1996, 1997, 1998, 385 pages.

CoStar User's Manual, "For AddressMate and AddressMate Plus", CoStar Corp., 1994-1995, pp. 1-1 thru Index-210.

Beitner, N.D. et al., "Multimedia Support and Authoring in Microcosm: An Extended Model", Department of Electronics and Computer Science, University of Southampton, Jul. 1993, 12 pages.

IBM Research Disclosure #368, "Multimedia Hyperlinks Automatically created for Reference Documents", Jun. 1993, 5 pages.

Microsoft® Office 97 User's Manual, "Getting Results with Microsoft® Office 97—Real World Solutions for the Work You Do", 1997, 1-703.

Corel® Corporation Limited, Corel® InfoCentral User's Manual, 1996, vol. 1, Version 7.0, 1996, 1 thru 86.

Corel® Office Professional 7 Quick Results, 1-531.

\* cited by examiner

| 302a | WriteLine 304a | 275 306a |
| 302b | Write 304b | 30 306b |
| 302c | Equals 304c | |
| 302d | | |
| | | |
| | | |
| | | |
| | | |
| | | |
| 302j | ReferenceEquals 304j | 2 306j |

CONSOLE 300

FIG. 3

PREDICTION AND PRE-SELECTION OF AN ELEMENT IN SYNTAX COMPLETION

FIELD OF THE INVENTION

The invention relates to programming tools and in particular to facilitated syntax completion in source code in which a pre-selection is done based on a history of user input.

BACKGROUND OF THE INVENTION

As the need for software solutions increases, it becomes increasingly important to increase programmer efficiency. One way to increase programmer efficiency is to make software tools smarter and more convenient for the programmer to use. Development environments are beginning to offer help to ease programming tasks. Some development environments have a feature that provides context-sensitive help as the user types. For example, if the user declares an instance of an object of a specific type, and then begins typing a line of code that references that object, the source code editor may display a list of valid properties, methods and events for the object. Selecting from the drop-down list may insert the member into the user's code, saving the programmer keystrokes, reducing typing errors and helping the programmer understand the code he is using. These and other smarter software development tools are described in U.S. Pat. No. 6,311,323 B1 issued Oct. 30, 2001, entitled "Computer Programming Language Statement Building and Information Tool", and U.S. Pat. No. 6,502,233 issued Dec. 31, 2002 entitled "Automated Help Information for Reference Information", U.S. Pat. No. 6,305,008 B1, issued Oct. 16, 2001 entitled "Automatic Statement Completion", U.S. patent application Ser. No. 10/218,222, filed Aug. 12, 2002, entitled "System and Method for Context-Sensitive Help in a Design Environment" and U.S. patent application Ser. No. 10/218,142, filed Aug. 12, 2002, entitled "System and Method for Browse Information Parsing without Compilation".

Existing tools, however, are insufficient. Although computers are uniquely suited to store and retrieve large quantities of information, typically computers are information parsimonious—that is, they throw away information they have collected instead of remembering it and using it to lighten the burden of the user. For example, instead of just displaying a list of valid members when a user has entered a reference, it would be helpful if a software tool could predict which element in the list is most likely to be selected by the user and pre-select that element so that the programmer has to type fewer characters and is less likely to make a logic or typing error.

SUMMARY OF THE INVENTION

A system, method and computer-readable medium containing instructions for predicting and pre-selecting an element associated with a reference is disclosed. Keystroke input into source code is dynamically monitored. When triggered, a list of elements associated with the reference is presented. The tool predicts the element that is most likely to be selected based on a history of past use. This predicted element may be preselected, and distinguished in some way from the other elements of the list. Upon selection of the distinguished element, the distinguished element may be inserted into the editor input source. If the distinguished element is not selected, another element from the list may be selected. A use count associated with the selected element is incremented and maintained in a history of past use. The history of past use may be cleared at any time.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram of an exemplary history file in accordance with one embodiment of the invention;

DETAILED DESCRIPTION OF ILLUSTRATIVE EMBODIMENTS

Overview

Figure 1:
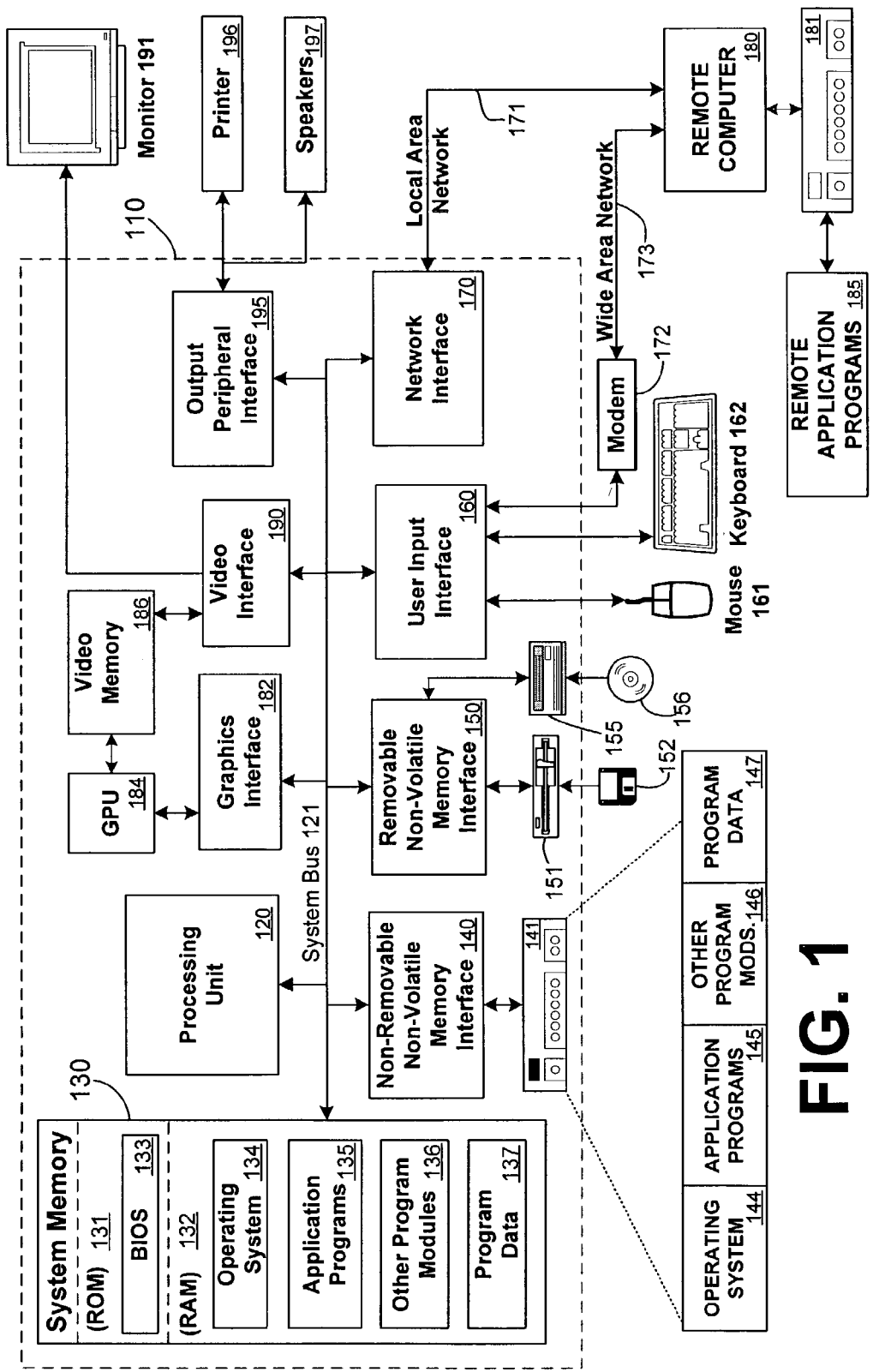
FIG. 1 is a block diagram showing an exemplary computing environment in which aspects of the invention may be implemented.

A context-sensitive design-time tool dynamically monitors user (e.g., developer) input during software development. When the tool is triggered (for example, by the typing of a reference type in source code followed by a scope operator which indicates that the reference type will be acted on), a list of elements associated with the reference type may be presented. The tool may predict the element that is most likely to be selected based on a table containing a history of past use of the reference type. This predicted element may be pre-selected and distinguished from the other elements in the member list (eg., the pre-selected element may be highlighted). Upon selection of the pre-selected element, (e.g., by entering a commit character), the element may be inserted into the source code. If the preselected element is not the desired element, another element from the member list may be selected by conventional means.

For example, suppose a user types the following code:
Console.

In this case, "Console" may represent an object. An object in object-oriented programming is a self-contained entity comprising both data and procedures to manipulate the data. Each object is a unique instance of a data structure defined according to a template provided by the object's class. Each object has its own values for the variables belonging to its class and can respond to the methods defined by its class. The object "Console" may have many different members, that is, valid methods that can be called on the object "Console". When a scope operator such as a period (".") is entered, a graphical member list may appear showing the members for the object. For example, suppose the valid members for "Console" include "Equals, Error, In, OpenStandardError, OpenStandardInput, OpenStandardOutput, Out, Read, ReadLine, ReferenceEquals, SetError, SetIn, SetOut, Write and WriteLine". In one embodiment of the invention, a scrollable, graphical list appears that includes at least some of these list members. In one embodiment of the invention, the graphical list appears superimposed on the text editor window. Alternatively, the graphical list may appear in a window disposed below the editor window. Alternatively, the graphical list may appear within other contexts such as, for example, a debugger, browser, e-mail or other process. Furthermore, one of the elements in the list may be pre-selected and distinguished from the other elements by being highlighted. The element that is chosen for pre-selection and highlighting may be chosen based on a table that includes information associated with the previous use of elements in the member list. In one embodiment of the invention, the element that is pre-selected and highlighted is chosen based on the element that has been most frequently used by that particular user. Alternatively, the element that is pre-selected and highlighted may be chosen based on the element that has been most recently used by that user. In other embodiments of the invention, the element that is pre-selected and highlighted is chosen based on the element that is most frequently used or most recently used overall or per project. The list may appear alphabetically sequenced, sequenced according to some pre-selected rule or may be randomly ordered.

For example, suppose that in the above example, the most likely to be selected member for "Console", based on information stored in a table of data associated with the object "Console", is "WriteLine". In this example, the member list may be displayed with the element "WriteLine" pre-selected and highlighted. If "WriteLine" is the desired element, the "WriteLine" element can be selected and written into text being edited in the editor by entering a commit character. If "WriteLine" is not the desired element, another element in the list may be selected by conventional means such as by using the up and down arrows or by continuing to type the name of the element until the desired element is highlighted or by typing the entire element name.

The history file can be cleared at any time via a user interface.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 2:
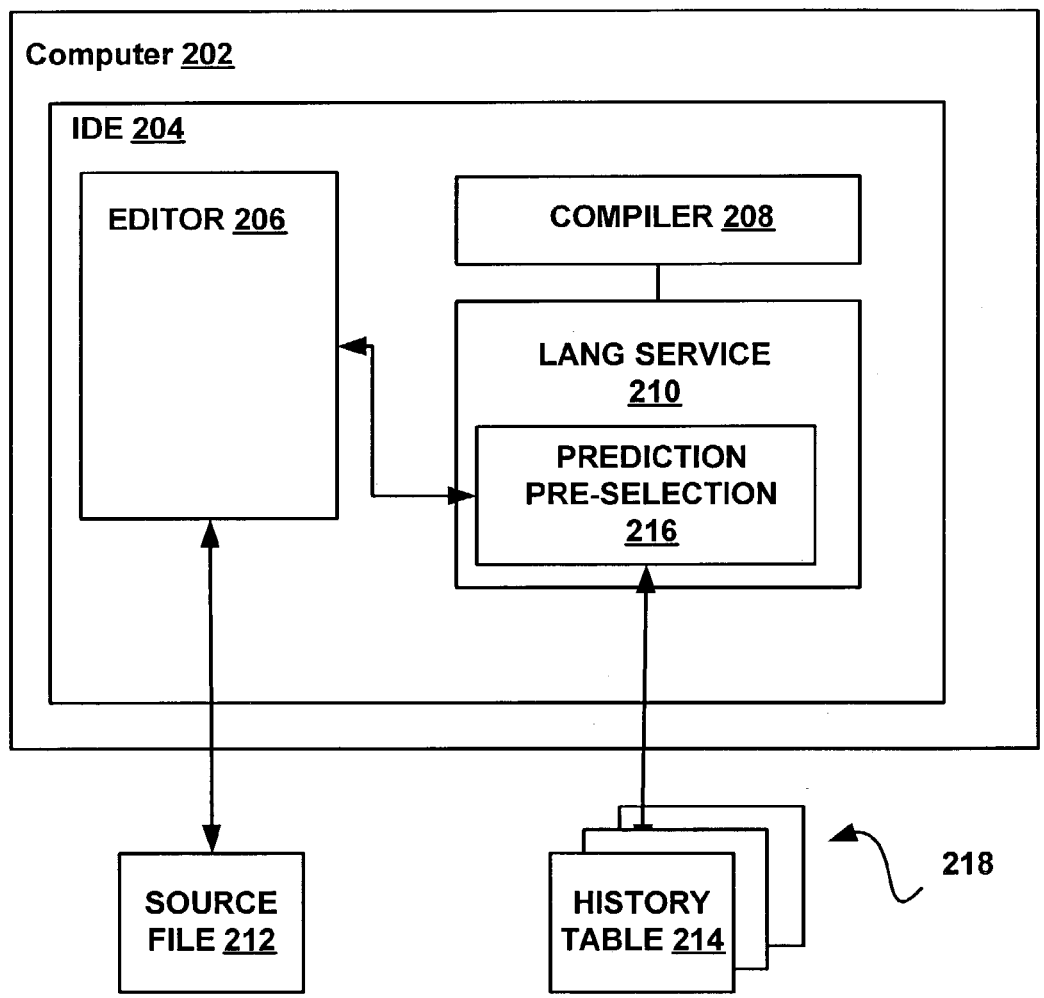
FIG. 2 is a block diagram of an exemplary system for predicting and pre-selecting an element for syntax completion based on history of use in accordance with one embodiment of the invention.

System and Method for Predicting an Element for Selection Based on History of Use and Pre-Selecting the Element in a List for Syntax Completion FIG. 2 illustrates an exemplary tool for predicting and pre-selecting an element for syntax completion in a source program editor based on history of use. Referring now to FIG. 2, computer 202 represents a computer such as but not limited to a user or development computer on which the invention may reside. The invention may be implemented as a component of an integrated design environment or as a stand-alone system. The tool may include a predictor/pre-selector component 216, and one or more of the following: one or more language services represented by language service 210, one or more editors represented by editor 206 for drafting and editing source code 212 and one or more compilers, represented by compiler 208. Those of ordinary skill in the art will appreciate that the design environment IDE 204 may also include other components, not shown in FIG. 2.

Source code file 212 typically is a set of instructions that a programmer or developer types or edits, and is written in a given programming language or combination of programming languages. Source code 212 typically comprises one or more statements, each statement typically comprising one or more expressions and/or entities. The expression and/or entities in the statement can be made up of multiple components. Source code 212 may be created or modified by editor 206 and may be persisted onto a stable storage medium.

One or more history tables 214 may be created by and/or modified by the prediction and pre-selection tool. A separate history table may be maintained for each reference type encountered. A number of such tables may be maintained in a history datastore 218, which may be implemented as a file or database.

Applications may be created from source code 212 using the design environment (e.g., exemplary integrated design environment (IDE) 204). The design environment may include one or more compilers, here represented by compiler 208, one or more language services, here represented by language service 210, one or more design tools (not individually shown), one or more editors, here represented by editor 206, browsers (not shown), and the like. IDE 204 may represent, for example, MICROSOFT VISUAL STUDIO NET, or DREAMWEAVER by MACROMEDIA or BORLAND C++ BUILDER STUDIO 6 or any other software development/design tool, compiler or environment.

A design environment such as IDE 204 may generate from source code 212 executable code capable of being run in an execution environment (not shown) or may generate an intermediate form of code that is interpreted or compiled again and run by an execution environment. Such an execution environment may include elements required in order to run the compilation produced by the design environment IDE 204 from the source code 212. The execution environment may include elements that produce native code from a non-device-specific intermediate language code. The development and execution environments may in addition include various class libraries (not shown). A suitable execution environment may, for example, represent MICROSOFT COMMON LANGUAGE RUNTIME .NET or JAVA or any other suitable execution environment. The application executable may be loaded, along with shared class libraries and the execution environment onto one or more computers (not shown) and run.

Editor 206 facilitates the development of source code 212 of a computer program. Editor 206 may be an ASP, BASIC, COBOL, FORTRAN, C, C++, a C#, JAVA, J#, VISUAL BASIC, REAL BASIC, DELPHI, PASCAL, HTML,XML, ADA, PERL, DYLAN, PYTHON, SMALLTALK, TCL-TK, EIFFEL editor, or the like. Editor 206 may represent another process with which the invention may be associated. For example, the invention may be implemented within a browser such as NETSCAPE, or MICROSOFT INTERNET EXPLORER, a program debugger or other programming tool, an e-mail handler or other process. The process may exist external to IDE 204.

Compiler 208 may represent an ASP, BASIC, COBOL, FORTRAN, C, C++, C#, JAVA, J#, VISUAL BASIC, REAL BASIC, DELPHI, PASCAL, HTML,XML, ADA, PERL, DYLAN, PYTHON, SMALLTALK, TCL-TK, EIFFEL compiler or interpreter or any other suitable compiler or interpreter. Compiler 208 may produce and persist a datastore (not shown) of information (e.g., metadata) concerning reference types encountered in the source code. This datastore, which may be a file or database, may also be accessed and updated by a dynamic parser component of a language service such as language service 210 and may be used by the prediction/pre-selection tool to validate reference types and reference type members, to display reference type members in a member list, and/or build or generate history table 214 as described more fully below.

Language service 210 may be optimized for use with Visual C++ code, with Visual C# code, with Visual Basic code, with Visual Java # code or the like. The programming languages anticipated for inclusion in the list of available language services includes the above-mentioned, COBOL and any other suitable language associated with program development, such as the ones listed above. Language service 210 may include a dynamic parser as described in U.S. Pat. No. 6,367,068 B1 issued on Apr. 2, 2002, entitled "Dynamic Parsing". Such a parser may operate to parse the source code 212 according to the parsing rules applicable to the programming language (e.g. a C++ parser, a C# parser, a Visual Basic parser, a J# parser or the like) The parser may parse only a subset of the source code, (e.g., the current reference type being edited). The parser may include heuristics to ignore certain non-fatal errors, such as but not limited to missing statement terminators, missing closing parenthesis, missing function terminators and the like. Similarly, language service 210 may include an automatic statement completion module, an automated help module and/or a statement building and information tool as described above.

Language service 210 may include a component associated with the predictor/pre-selector tool. Alternatively, the prediction/pre-selector component may exist external to language service 210. Prediction/pre-selection component 216 may represent the assembly or dynamic linking library containing the programming logic for performing the prediction and pre-selection of the displayed list element for syntax completion as discussed more fully below. The predictor/pre-selector component 216 may parse user keystrokes for a scope operator, a triggering character or sequence of characters, as the keystrokes are input. Upon detection of the scope operator, the prediction/pre-selector component may determine what valid members are associated with the reference type preceding the scope operator and display a list or partial list of valid members of the reference type.

For example, suppose the user types:
Console.
The input of the scope operator, period ".", in one embodiment, triggers the display of a list of the valid members of "Console". In one embodiment of the invention, the history table 214 for the reference type is accessed to predict which member of the reference type is likely to be the desired member.

FIG. 3 is an exemplary table layout for a history table 214 of history file 218. In one embodiment of the invention a history table such as history table 300 for reference type "Console" comprises 10 slots or cells 302a-j, where each cell 302a-j includes the name of the member 304a-j and a use count, the number of times the member has been used 306a-j. One of skill in the art will recognize that the invention is not so limited, that is, use of any suitable number of cells is considered within the scope of the invention, and additional data elements may be included within each cell. For example, the number of cells chosen may be determined by asymptotic efficiency of a search algorithm and the space required to store the information.

In one embodiment of the invention the table is implemented as an array, and as illustrated in FIG. 3, may be sequenced in descending order of number of times the member has been selected or used. Alternatively, the table may be implemented as an array sequenced in descending order of the most recently used element. In one embodiment, the element chosen for pre-selection and/or highlighting is the first element in the array. Alternatively the array may be sequenced randomly, alphabetically or in ascending order of most recently used or most frequently used and may be traversed to find the desired element for pre-selection and highlighting based on some pre-determined criterion.

History table 214 may be initialized (member names removed and/or use counts set to zero) via a user interface accessible from the development environment (e.g., from the General property page for the desired language).

Figure 4:
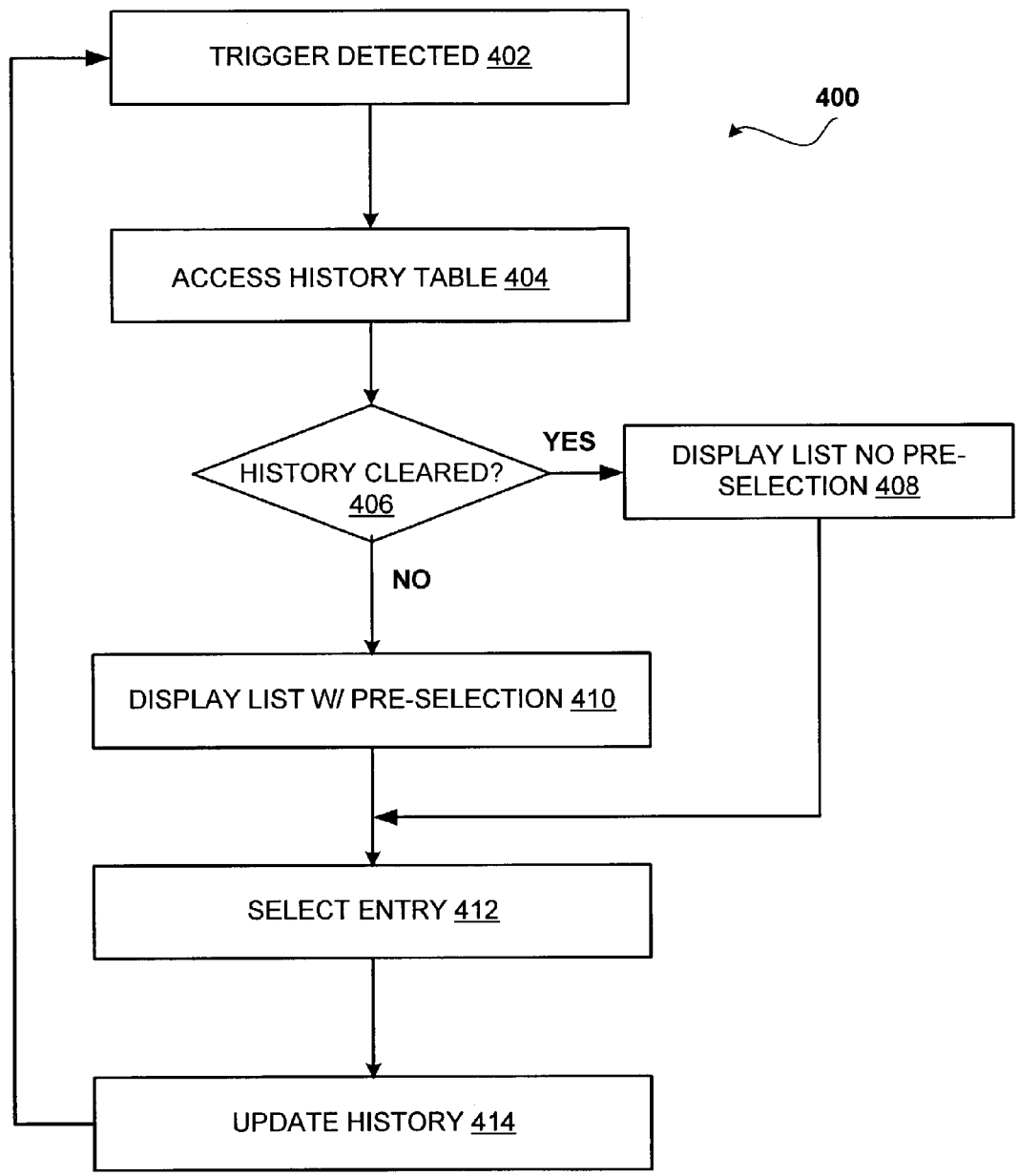
FIG. 4 is a flow diagram of an exemplary method for predicting and preselecting an element for syntax completion based on a history of use in accordance with one embodiment of the invention.

FIG. 4 illustrates an exemplary method 400 for prediction/pre-selection of an element for syntax completion in accordance with one embodiment of the invention. Referring now to FIG. 4, at step 402 a triggering event is encountered. A triggering event may be the entering of a scope operator associated with a type, such as (as, for example in the C# language: a value type or reference type. A value type is either of struct or enumeration type and includes simple, numeric, integral and floating point types. A reference type may include the following: class type, interface type, array type, delegate type or the like. Hence, contemplated reference types for the C# language include any of the following: namespaces, classes, interfaces, delegates, structs, simple types, events, enumerations and may include other reference types as the C# language evolves. In other languages, there will exist other constructs not specifically listed here but known to those of skill in the art.

Contemplated scope operators for the C# language include the period and double colon, "::", (associated with the namespace reference type), and may include other characters as well. Suitable scope operators for other languages will be known to those skilled in the art. In one embodiment of the invention, the character recognized as the scope operator for an object is the period ".", however, any suitable character may be recognized as the scope operator and the character designated for the scope operator for one reference type may differ from the character recognized as the scope operator for another reference type. Similarly, a reference type may have one or more recognized scope operators. When the triggering scope operator is detected, the word preceding the scope operator in the source text is examined and validated.

In one embodiment of the invention, the list box may also be invoked by entering a keyboard shortcut such as (but not limited to), for example, CTRL+J or CTRL+SPACE. The list member feature may also be invoked by selecting a menu option, or by right-clicking the text editor and selecting the list member option of the shortcut menu or by selecting a list member toolbar button from an editor toolbar. In one embodiment of the invention, when the list member feature is invoked on a blank line or outside of a recognizable scope, the members list displays symbols in the global namespace.

The reference type preceding the scope operator is validated and a list of members for the reference type are displayed. In one embodiment of the invention the compiler and/or dynamic parser provides metadata associated with the reference type for this purpose. For example, if the reference type entered is "Console", the compiler and/or dynamic parser may be invoked to retrieve and pass the metadata associated with "Console" to the prediction/pre-selection component. If "Console" is a valid reference type (metadata for the object is returned by the compiler/dynamic parser), at least a partial list of valid members for "Console" may be displayed.

Suppose the valid list of members of the object Console, as determined by the compiler/dynamic parser is "Equals, Error, In, OpenStandardError, OpenStandardInput, OpenStandardOutput, Out, Read, ReadLine, ReferenceEquals, SetError, SetIn, SetOut, Write and WriteLine".

The history file comprising the one or more tables of reference types may then be accessed to find the reference type preceding the scope operator. Suppose for example that the entry:

Console.

has been entered. In this case, the history file would be accessed (step 404) to find the table associated with the reference type "Console". If this is the first time the feature is accessed (step 406) or the history table has been cleared, the reference type member slots may be empty and use counts may be blank or zero. In this case, in one embodiment of the invention, the member list returned may be the list of members returned from the compiler and may be in alphabetical order, step 408, with pre-selection of a member. The first member of the object (e.g., the first member alphabetically) may be distinguished by the presence of a focus box surrounding the member, as shown in FIG. 5.

Figure 5:
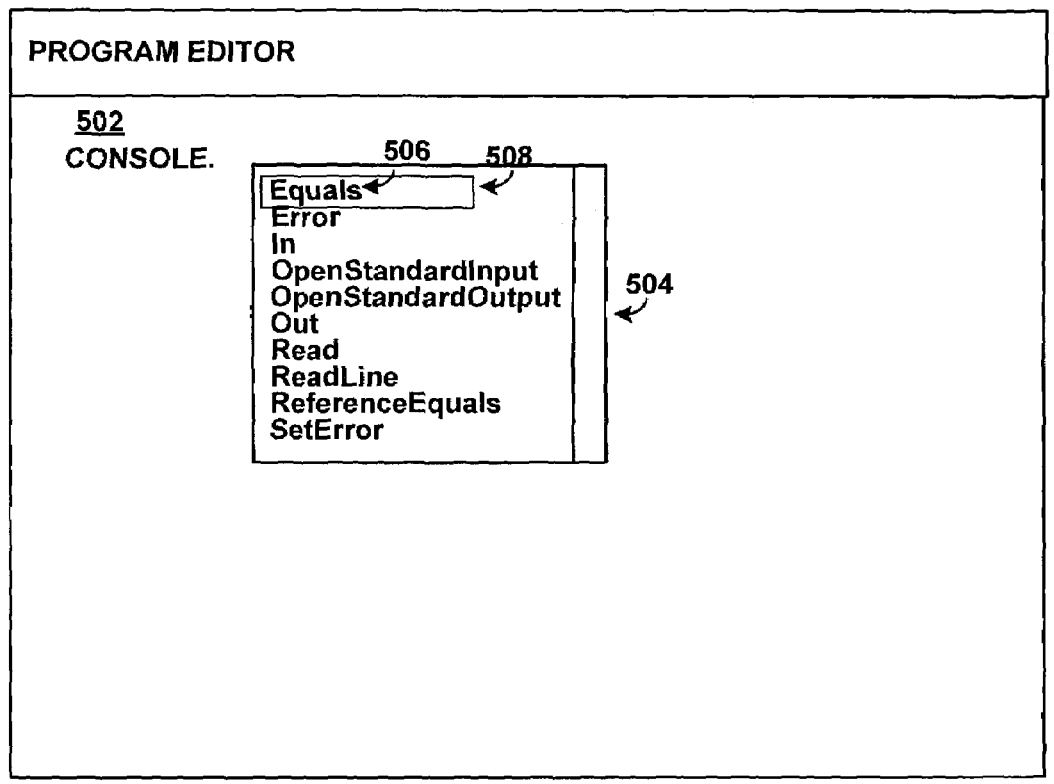
FIG. 5 is a screen shot illustrating an exemplary member list as it appears when there is no history for the reference in accordance with one embodiment of the invention.

In FIG. 5, the member list for the object "Console" is displayed, with the alphabetically first member of "Console" (Equals 506) displayed within a focus box 508 as shown in FIG. 5. Text area 502 is overlaid by list member box 504 containing a predetermined number of entries (e.g., 10) of which the (alphabetically) first element Equals 506, is emphasized by the presence of focus box 508.

Figure 6:
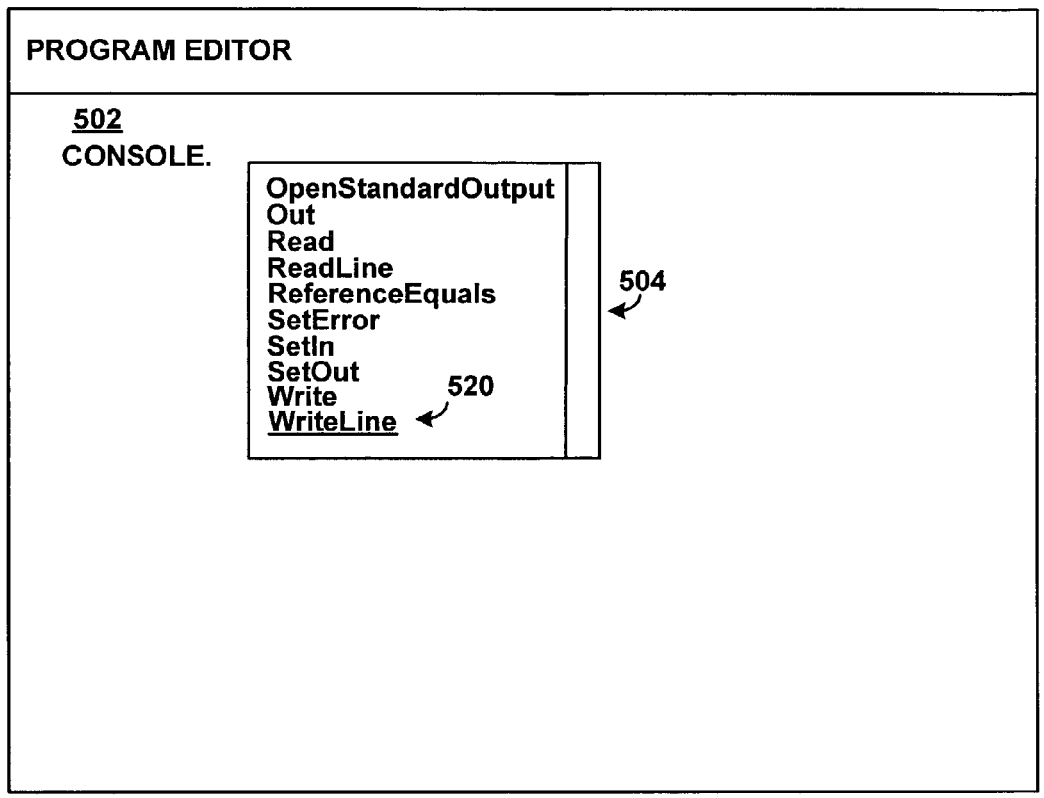
FIG. 6 is a screen shot illustrating an exemplary member list as it appears when a history for the reference exists in accordance with one embodiment of the invention.

If the history table has not just been initialized, at step 410, the member list returned appears in one embodiment of the invention, as displayed in FIG. 6, with the alphabetical list of valid members as before, but with the member having the highest use count pre-selected and highlighted. (In FIG. 6, highlighting is depicted by underlining.) That is, a prediction is made of the list member that is most likely to be desired, by consulting a table of previously chosen list members to determine which member has been chosen most often in the past. Alternatively, the prediction may be based on which member was chosen most recently by consulting, for example, a time-stamp stored in the table associated with the last choice of a member of the member list and predicting that the most likely selection is the member with the latest time-stamp.

For example, the member list of the object "Console" may be displayed, as shown in FIG. 6. List member WriteLine 520 is highlighted because WriteLine has the highest use count in the history table (FIG. 3) for the object "Console".

At step 412 a member from the list is selected. The highlighted entry is already pre-selected and in one embodiment of the invention, is entered into the text by entering a commit character. If the highlighted member is not the member desired, a different member can be selected by using the arrow keys to navigate through the list, of by typing the first few letters of the member name and so on.

At step 414 the selected member is inserted into the source code. To insert the selected member into the source code, the character that will follow the member, such as open parenthesis "(", comma ",", space " ", semicolon ";" or other character recognized as a commit character is typed. In one embodiment of the invention, the selected member plus the commit character just typed is entered into the text. In one embodiment, TAB, CTRL+ENTER, ENTER or double-clicking the mouse inserts just the member. CTRL-ENTER may insert the item distinguished by a focus box, even if the element is not selected. The member list may be closed by entering ESC. The point of attention may be moved to the first or last element of the list by using CTRL-Page Up or CTRL-Page Down while in the list members display.

After the desired member is selected, the history table associated with the type reference is updated. For example, if the WriteLine member is selected and entered into the text, the use count for WriteLine is incremented by 1 in the table associated with object "Console". If there is no entry in the table for list member "WriteLine", an entry is made for WriteLine and the use count is set to 1. In one embodiment of the invention, if all the cells allocated for the table for Console are used, a local counter for WriteLine is maintained and at the end of the session, the table is updated. For example, if WriteLine is not in the table, but during a session, 20 uses of WriteLine were detected, and one of the cells in the table has a list member SetError with a use count of 19, WriteLine and its use count may be substituted for SetError and its use count.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for predicting a desired element associated with a reference for syntax completion in source code, comprising:
   a prediction component in a software design environment that predicts a desired element for syntax completion of a statement in source code from a plurality of elements comprising methods associated with a class of an object oriented programming object associated with a reference comprising the object-oriented programming object, the prediction of the desired element based on information associated with past use of at least one element of the plurality of the elements associated with the reference, wherein the prediction is triggered by receiving the reference followed by a scope operator comprising a period (.) or double colon (::); and
   a data store for storing the information associated with the past use of the at least one element associated with the reference.

2. The system of claim 1, wherein the reference comprises an interface.

3. The system of claim 1, wherein the reference comprises a struct.

4. The system of claim 1, wherein the reference comprises a namespace.

5. The system of claim 1, wherein the reference comprises a delegate.

6. The system of claim 1, wherein the reference comprises a type.

7. The system of claim 1, wherein the reference comprises an event.

8. The system of claim 1, wherein the reference comprises an enumeration.

9. The system of claim 1, wherein the reference comprises a class.

10. The system of claim 1, further comprising a compiler for providing a list of valid references in the source code.

11. The system of claim 10, wherein the compiler further provides a list of valid elements associated with at least one of the references in the list of valid references.

12. The system of claim 1, further comprising an editor for displaying and updating source text, wherein the editor accepts a selected element from a list of displayed elements and inserts the selected element into the source text.

13. The system of claim 1, further comprising a language service which dynamically parses the source code statement and triggers a display of a list of elements associated with the reference upon detection of a triggering event.

14. The system of claim 1, wherein the information associated with the past use of the at least one element associated with the reference comprises a table for each reference in the source code, the table comprising cells for a predetermined number of reference elements and a use count cell for each reference element of the predetermined number of reference elements.

15. The system of claim 1, wherein the information associated with the past use of the at least one element associated with the reference comprises a table for each reference in the source code, the table comprising cells for a predetermined number of reference elements and a timestamp cell for storing the time of last use for each reference element of the predetermined number of reference elements.

16. A method for completing syntax in source code, the method comprising:
   in response to detecting a triggering event comprising receiving a reference comprising an object-oriented programming object followed by a scope operator comprising a period (.) or double colon (::), when the source code is being created, predicting a desired element for syntax completion associated with the reference based on information associated with past use of at least one of a plurality of elements associated with the reference.

17. The method of claim 16, frirther comprising displaying a list of elements associated with the reference, wherein the predicted element is distinguished from the other displayed elements.

18. The method of claim 17, wherein the predicted element is distinguished from the other displayed elements by highlighting the predicted element.

19. The method of claim 17, frirther comprising receiving a user-selected element from the displayed list of elements.

20. The method of claim 19, frirther comprising incrementing a use counter in the information associated with past use of at least one of the plurality of elements, the use counter associated with the selected element, the selected element associated with the reference.

21. The method of claim 19, frirther comprising entering the selected element into the source code.

22. The method of claim 16, wherein the triggering event comprises entering a predetermined character preceded by a reference.

23. The method of claim 16, wherein predicting the desired element associated with the reference based on information associated with past use of at least on of the plurality of elements associated with the reference comprises determining the most frequently used element of the plurality of elements.

24. The method of claim 16, wherein predicting the desired element associated with the reference based on the history of past use comprises determining the most recently used element of the plurality of elements.

25. The method of claim 16, wherein the predicted element is highlighted.

26. The method of claim 16, further comprising accessing a table comprising the information associated with the past use of at least one of a plurality of elements associated with the reference.

27. The method of claim 16, wherein the reference is validated by comparison with a list of valid references provided by a compiler.

28. The method of claim 17, wherein the list of elements associated with the reference is validated by comparison with a list of valid elements for the reference provided by a compiler.

29. The method of claim 16, wherein the triggering event is detected by a dynamic parser that monitors keystroke input into a source code editor.

30. The method of claim 16, wherein the information associated with past use of the elements associated with the reference can be cleared via a user interface.

31. The method of claim 30, wherein clearing the history of past use comprises setting a use counter associated with at least one element associated with the reference to zero.

32. The method of claim 30, wherein clearing the history of past use comprises clearing a table of elements associated with a reference.

33. The method of claim 16, wherein the reference comprises an interface.

34. The method of claim 16, wherein the reference comprises a struct.

35. The method of claim 16, wherein the reference comprises a namespace.

36. The method of claim 16, wherein the reference comprises an enumeration.

37. The method of claim 16, wherein the reference comprises a delegate.

38. The method of claim 16, wherein the reference comprises a class.

39. The method of claim 16, wherein the reference comprises a type.

40. The method of claim 16, wherein the reference comprises an event.

41. A computer-readable storage medium comprising computer-executable instructions for:

in response to detecting a triggering event comprising receiving a reference comprising an object-oriented programming object followed by a scope operator comprising a period (.) or double colon (::), indicating that an element associated with the reference is to be selected when editing source code, predicting a desired element associated with a reference based on information associated with past use of a plurality of elements associated with the reference;

displaying a list of elements associated with the reference; and distinguishing the predicted element for the other elements in the displayed list of elements associated with the reference.

* * * * *